(12) United States Patent
Kamiyama et al.

(10) Patent No.: US 7,686,054 B2
(45) Date of Patent: Mar. 30, 2010

(54) APPARATUS FOR EVERTING A LINING MATERIAL

(75) Inventors: Takao Kamiyama, Hiratsuka (JP); Koji Kaneta, Hiratsuka (JP); Kenji Fujii, Hiratsuka (JP); Ryoichi Goto, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 558 days.

(21) Appl. No.: 11/586,128

(22) Filed: Oct. 25, 2006

(65) Prior Publication Data

US 2007/0095472 A1    May 3, 2007

(30) Foreign Application Priority Data

Nov. 1, 2005    (JP) .............................. 2005-317878

(51) Int. Cl.
*F16L 55/16* (2006.01)
(52) U.S. Cl. .................. 156/423; 156/64; 156/293; 156/294; 156/287; 156/379
(58) Field of Classification Search ................ 156/379, 156/64, 293, 294, 287, 423
See application file for complete search history.

(56) References Cited

U.S. PATENT DOCUMENTS

| | | | | |
|---|---|---|---|---|
| 2,794,758 A | * | 6/1957 | Harper et al. ............... | 156/286 |
| 6,631,739 B2 | * | 10/2003 | Kamiyama et al. ............ | 138/98 |
| 2006/0048832 A1 | * | 3/2006 | Blackmore et al. ............ | 138/98 |

* cited by examiner

*Primary Examiner*—Jeff H Aftergut
*Assistant Examiner*—Jaeyun Lee
(74) *Attorney, Agent, or Firm*—Adam & Wilks

(57) ABSTRACT

An apparatus for everting a pipe-lining material for rehabilitating an existing pipe. The apparatus has a storage container for storing a pipe-lining material in an un-everted state, an eversion nozzle for everting the pipe-lining material, and a mounting pipe for removable connection between the storage container and the eversion nozzle. The everting nozzle has a nozzle opening to which the un-everted pipe-lining material is attached and which confronts an opening of the pipeline to be rehabilitated during use of the apparatus. The mounting pipe has an exterior surface, an interior space, a side portion provided with at least one opening communicating the exterior surface with the interior space, and an upper portion with an open end through which the un-everted pipe-lining material is inserted for attachment to the nozzle opening of the eversion nozzle.

18 Claims, 7 Drawing Sheets

APPARATUS FOR EVERTING A LINING MATERIAL

BACKGROUND OF THE INVENTION

1. Field of the Invention

The present invention relates to an apparatus for everting a lining material, and particularly relates to an apparatus for everting and inserting a tubular pipe-lining material into a deteriorated underground pipeline to line and rehabilitate the interior surface thereof.

2. Description of the Prior Art

There are pipe lining methods for lining the interior of sewage pipes, gas pipes, communication cable pipes, power cable pipes, and other deteriorated underground pipes and repairing the pipes without unearthing the pipes from the ground.

A known example of such above-described pipe lining methods is to use a pipe-lining material composed of a tubular resin-adsorbing material that is covered at its external surface with an airtight plastic film and is impregnated with an uncured liquid curable resin. In this method, the pipe-lining material is everted and inserted into a pipeline by fluid pressure using a lining material everting apparatus, and the curable resin impregnated in the pipe-lining material is thereafter cured in a state in which the pipe-lining material is inflated by fluid pressure and pressed to the inner surface of the pipeline.

Ordinarily, the pipe-lining material is stored in a storage container with an airtight structure in which the material is flattened and folded. One end of the pipe-lining material stored in the storage container is curved outward, connected to the storage container, and mounted on the external periphery of the opening end of an everting nozzle. Fluid pressure acts inside the storage container and the material is inserted into the pipeline while being everted (Japanese Laid-open Patent Application 2003-165158).

With a conventional lining material everting apparatus, the pipe-lining material is folded and stored in a storage container prior to being everted. Therefore, the resistance of being drawn out of the container during eversion is considerable, and there is a problem in that a considerable everting force is required.

Also, since the pipe-lining material is folded and stored, there is problem in that the upper portion of the folded pipe-lining material shifts up and down in accordance with the amount drawn out during the operation, and the drawing out process cannot be smoothly carried out.

When working with a conventional lining that is to be disposed in an existing pipeline, the everting nozzle is mounted in the vertical direction, and the pipeline to be repaired extends horizontally. Therefore, the pipe-lining material everted by the everting nozzle is curved at the location in which the direction of the material changes from the vertical to horizontal direction. This causes considerable friction to be generated, resulting in eversion resistance. In particular, the lining material may stop everting partway in the process when the lining material has considerable thickness and a large amount of everting pressure is required, or when the lining material is heavy because of a large diameter.

It is therefore an object of the present invention to provide an apparatus that enables a lining material to be smoothly and reliably everted and inserted into an affected pipeline without stopping the lining process partway.

SUMMARY OF THE INVENTION

The present invention provides an apparatus for everting and inserting a pipe lining material impregnated with a curable resin for use in rehabilitating an underground pipeline that extends in a direction inclined relative to the vertical direction. The apparatus comprises a storage container for storing an un-everted pipe-lining material, and an everting nozzle disposed so that the nozzle opening faces the opening of the pipeline to be rehabilitated. The pipe-lining material drawn from the storage container is brought un-everted up to the everting nozzle and attached to the nozzle opening thereof and fluid pressure is applied inside the pipe-lining material for eversion and insertion in the pipe-extending direction of the pipeline to be rehabilitated.

In accordance with the present invention, the pipe-lining material begins to evert at the pipeline opening because the everting nozzle is disposed so that the nozzle opening on which the pipe-lining material is mounted faces the pipeline opening, and the pipe-lining material is not everted, remains flat until it reaches the pipeline opening. This allows no considerable friction to be generated at the curved portion where the travel direction of the pipe-lining material changes toward the pipeline opening, thus enabling the pipe-lining material to be smoothly and reliably everted and inserted into the affected pipeline.

DESCRIPTION OF THE PREFERRED EMBODIMENTS

Figure 1:
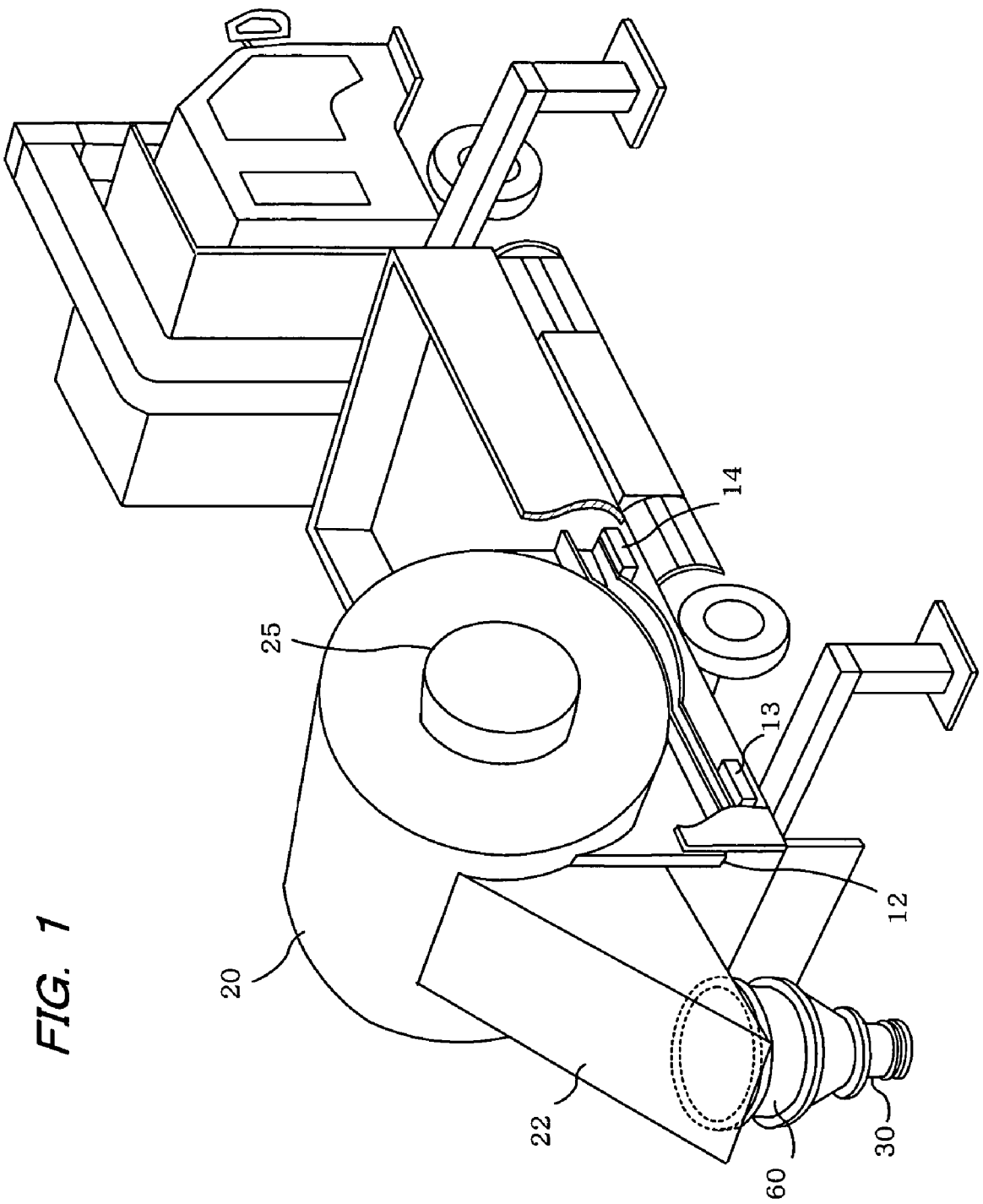
FIG. 1 is a perspective view showing a pipe-lining material everting apparatus mounted on a truck.

The present invention will be described below in detail with reference to the embodiments shown in the drawings.

FIG. 1 shows the external appearance of an apparatus for everting a pipe-lining material for rehabilitating pipes such as sewage pipes, gas pipes, communication cable pipes, power cable pipes, and other deteriorated underground pipes. The component indicated by the reference numeral 20 is a storage container having an airtight structure in which the pipe-lining material is stored, and is ordinarily mounted on a load-carrying platform of a truck by way of two support plates 12 (one of which is not visible) so as to be moved to a work site. Vertical adjustment mechanisms 13 and 14 (the remaining two are not visible and are not shown) are disposed at the four corners of the storage container 20, and the storage container 20 can thereby be kept horizontal.

Figure 2:
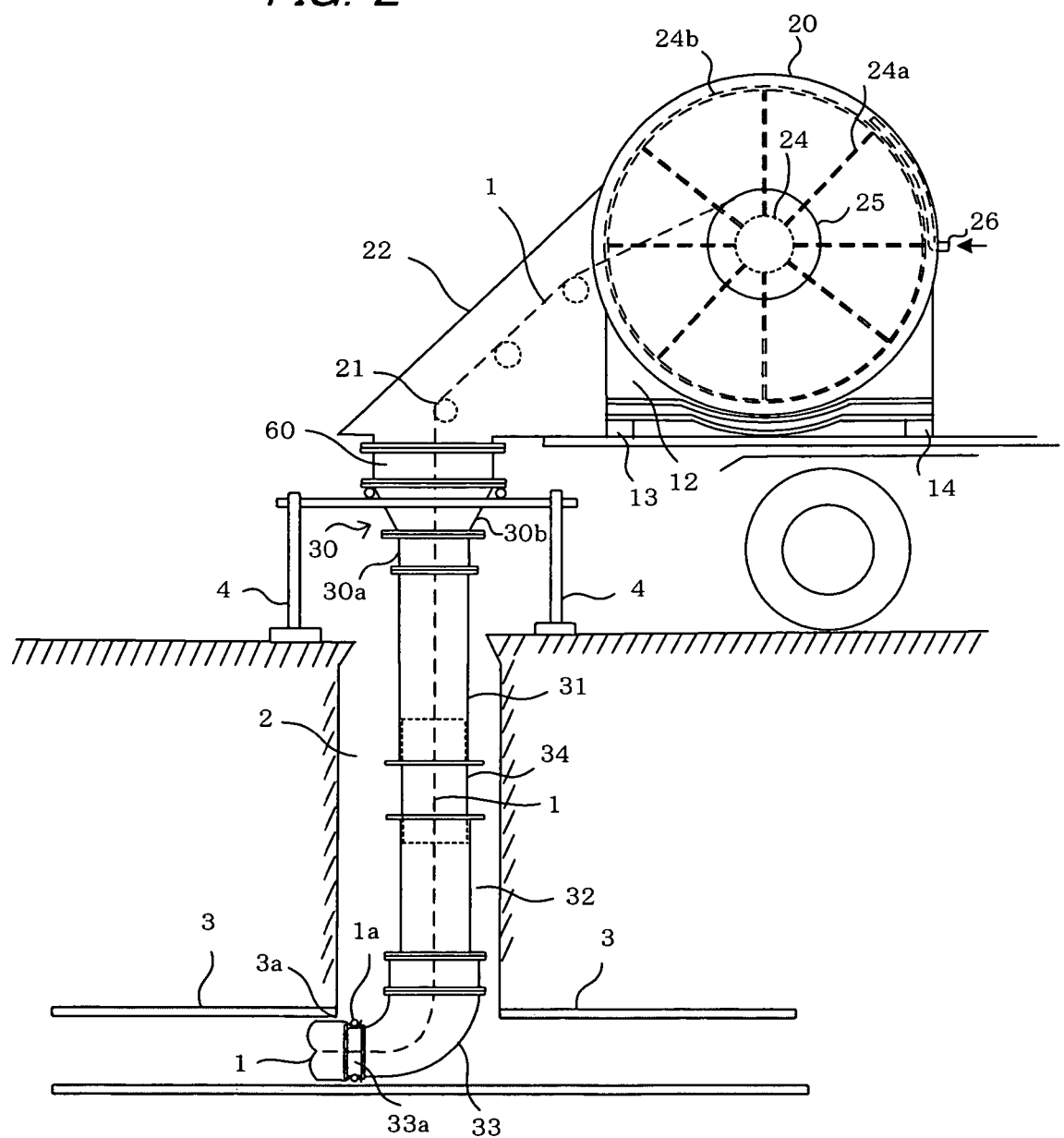
FIG. 2 is a schematic view showing the pipe-lining material being everted and inserted from a manhole into a pipeline.

As shown in FIG. 2, a guide unit 22 having a plurality of guide rollers 21, and an induction nozzle 30 installed by way of a mounting pipe 60, are detachably mounted on the storage container 20. The induction nozzle 30 comprises a columnar portion 30a and a conical portion 10 30b extending in the vertical direction. A guide pipe 31 is detachably mounted in an airtight manner on the lower end of the induction nozzle 30 and a curved eversion or everting nozzle 33 is detachably mounted in an airtight manner by way of an adjustment pipe 34 and a guide pipe 32.

The guide pipes 31 and 32 are airtightly coupled together so that the adjustment pipe 34 and the mounting position can be adjusted. The vertical position of the everting nozzle 33 can be adjusted in accordance with the depth of the pipeline 3 embedded in the earth by adjusting the position of the guide pipes 31 and 32 relative to the adjustment pipe 34.

The mounting pipe 60, as described hereinbelow, has a structure that allows an air supply hose, an air exhaust hose, a heat medium supply hose, a heat medium drain hose, and the like to be guided from the side portion into the interior of the pipes after the pipe-lining material 1 has been everted and inserted into the pipeline. It is to be noted that hose mounting ports are airtightly sealed before the hoses are mounted and the structure overall is made airtight.

Figure 3A:
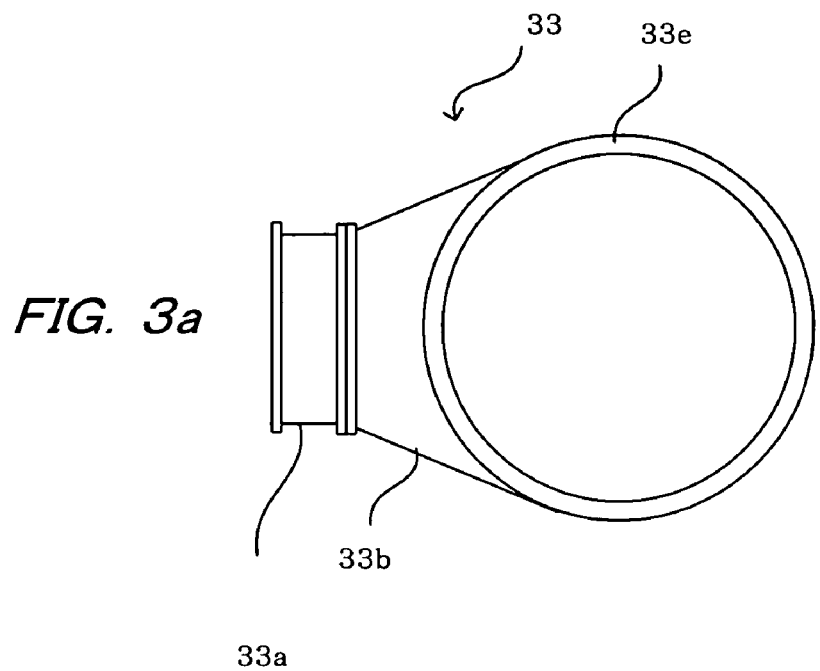
FIG. 3a is a top view of the everting nozzle.
Figures 3B, 3C:
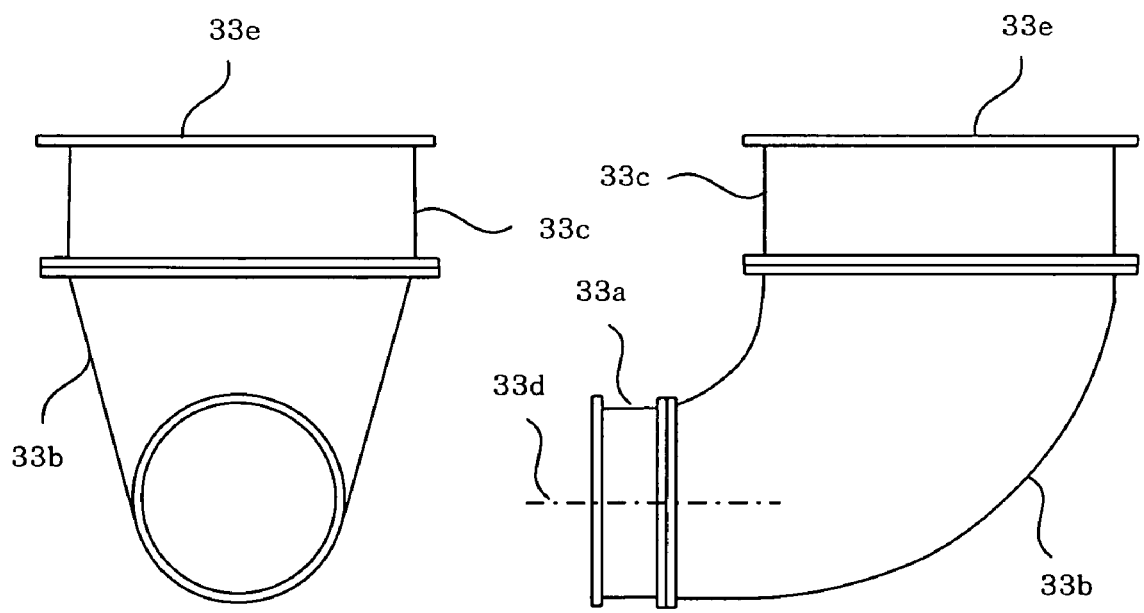
FIG. 3b is a front view of the everting nozzle.
FIG. 3c is a side view of the everting nozzle.

As shown in FIGS. 3a to 3c, the everting nozzle 33 comprises a nozzle opening 33a at the columnar distal end on which the pipe-lining material is mounted, a columnar portion 33c in which the orientation of the opening is substantially orthogonal to the nozzle opening 33a, and a curved portion 33b for linking the nozzle opening 33a and the columnar portion 33c. The everting nozzle is disposed so that the nozzle opening 33a faces the opening 3a of the pipeline 3 to be rehabilitated, and the axial center 33d of the nozzle 33 substantially matches the direction (horizontal direction) in which the pipeline 3 extends. The columnar portion 33c is airtightly coupled to the guide pipe 32 by way of a flange 33e. Therefore, except for the open-ended nozzle opening 33a, the entire structure is airtightly sealed when the everting nozzle 33, guide pipes 32 and 31, adjustment pipe 34, induction nozzle 30, mounting pipe 60, guide unit 22, and storage container 20 are coupled together.

Bearing units 25 for rotatably supporting a reel 24 are mounted on the two ends of the storage container 20. The reel 24 is used for winding the pipe-lining material 1 into a roll and is driven by an electrically-driven motor (not shown) so as to rotate in the clockwise direction as viewed in FIG. 2. The pipe-lining material 1 is thereby wound into a roll on the reel 24. Wheels 24b provided with a plurality of spokes 24a are mounted on the two ends of the reel 24, and the pipe-lining material 1 is thereby reliably wound.

When the pipe-lining material 1 wound onto the reel 24 is drawn out from the storage container 20, the reel 24 rotates in the reverse direction due to the torque that acts on the reel 24. This causes the electrically-driven motor to be rotated to operate as a power generator and a brake, which is used to control the drawing out of the pipe-lining material.

A duct 26 is mounted on the storage container 20 in order to provide the storage container 20 with fluid pressure (compressed air) for everting the pipe-lining material 1.

The pipe-lining material 1 wound on the reel 24 is a known pipe-lining material, and comprises a tubular resin-absorbing material which is impregnated with an uncured liquid curable resin and in which the external surface is airtightly covered with a plastic film. Polyethylene, vinyl chloride, vinylon, polyurethane, nylon, polypropylene, polyethylene-nylon copolymer, or another filmed is used as the plastic film; and polyester, nylon, acrylic, vinylon, or another nonwoven is used as the tubular resin-absorbing material. Unsaturated polyester resin, epoxy resin, or another heat curable resin can be used as the uncured liquid curable resin to impregnate the tubular resin adsorbing material. The pipe-lining material has a flat shape prior to being everted. The inner surface of the pipe-lining material 1 may also be airtightly covered with a plastic film in the same manner as the external surface.

Described below are processes for lining a pipeline using an everting apparatus such as the one described above.

The everting apparatus is loaded onto an ordinary truck. The pipe-lining material 1 is fixed at one end to the reel 24, wound on the reel 24 in the form of a roll by using an electrically-driven motor, and stored in the storage container 20. The main body of the everting apparatus is moved so that the induction nozzle 30 is positioned above a manhole 2, and the guide pipes 31 and 32 are mounted on the lower end of the induction nozzle 30 by way of the adjustment pipe 34. The everting nozzle 33 is disposed so that the axial center 33d of the nozzle 33 is oriented in the extended direction of a pipeline 3 to be rehabilitated, and its nozzle opening 33a is aligned with the opening 3a of the pipeline 3. This work is carried out by adjusting the mounting position of the guide pipes 31 and 32 on the adjustment pipe 34. Guide pipes 32 having a variety of lengths may be prepared in such a case rather than using the adjustment pipe 34. A guide pipe is selected having a length that substantially brings the nozzle opening 33a and pipeline opening 3a into alignment when the guide pipe 32 and the everting nozzle 33 are mounted, and the selected guide pipe is then coupled to the guide pipe 31. Depending on the depth of the pipeline 3, the induction nozzle 30 and everting nozzle 33 may be coupled using only a single guide pipe.

Figure 4:
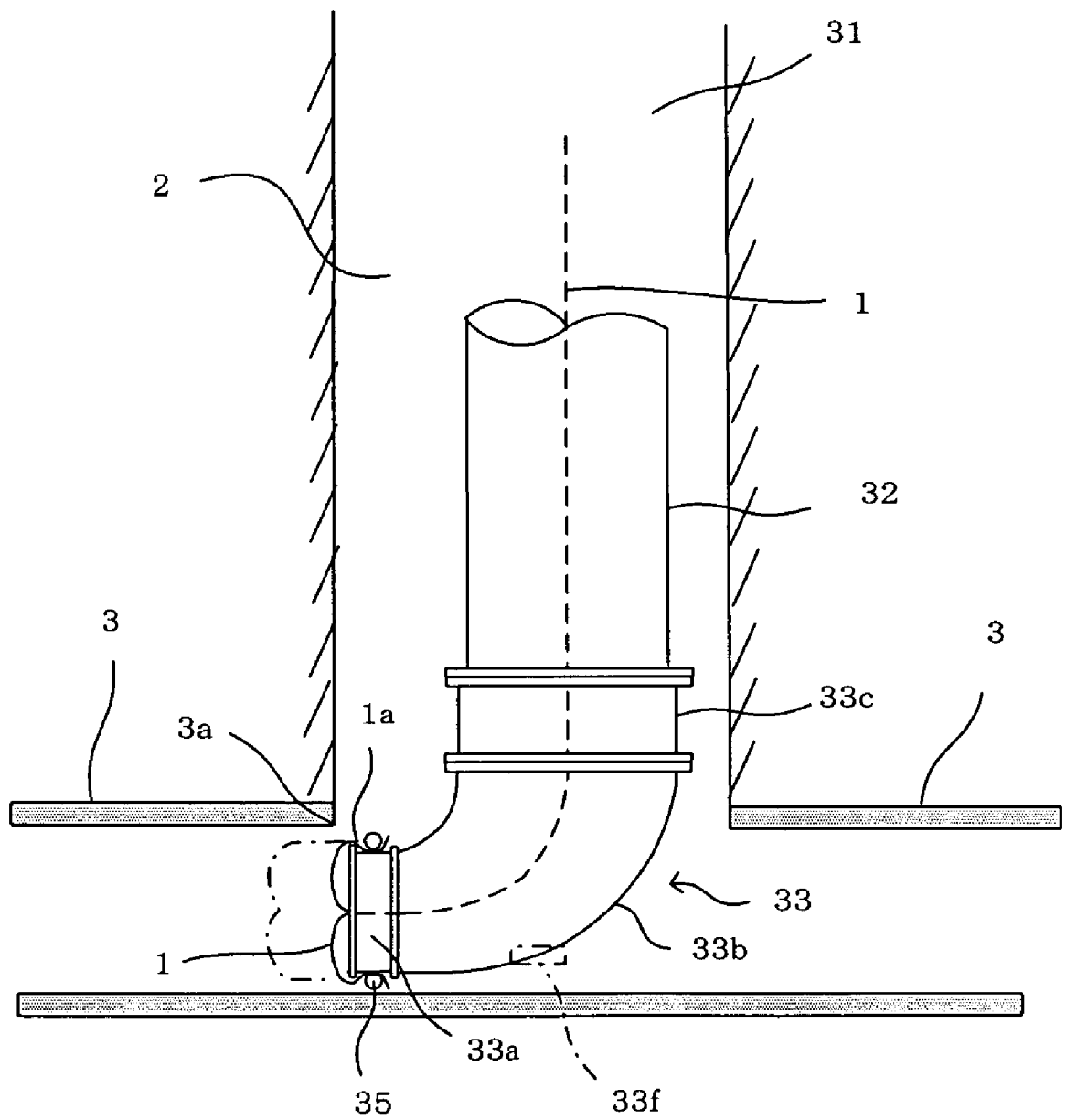
FIG. 4 is a schematic view showing the process for everting and inserting the pipe-lining material into a pipeline to be rehabilitated.

When the everting nozzle 33 is positioned in place, as mentioned above, foot supports 4 are assembled and the induction nozzle 30 is also supported as needed. The other end 1a of the pipe-lining material 1 is thereafter brought to the nozzle opening 33a of the everting nozzle 33, outwardly folded back, and airtightly mounted using a band 35 or the like on the external periphery of the nozzle opening 33a, as shown in FIG. 4.

Compressed air is subsequently fed into the storage container 20 by way of the duct 26, and the pipe-lining material 1 is unwound from the reel 24 and drawn from the storage container 20 when the fluid pressure (compressed air) acts on the folded back portion of the pipe-lining material 1 on the opening 33a of the nozzle 33. The pipe-lining material is inserted in the downward vertical direction inside the manhole 2 without being everted, as indicated by the dotted line. At this point, the electrically-driven motor operates as a power generator and rotates the reel 24 in the reverse direction. That is, the motor serves as a brake to the drawing out of the pipe-lining material 1.

The pipe-lining material 1 inserted without being everted in the manhole 2 curves from the vertical direction to the horizontal direction, arrives at the nozzle opening 33a, and is everted at this location by the action of the fluid pressure for insertion inside the pipeline 3. In this manner, the pipe-lining material 1 first begins to evert at the location of the pipeline opening 3a, and therefore remains flat and un-everted at the location of the curved portion 33b of the everting nozzle 33 that changes direction. Therefore, the pipe-lining material is smoothly and reliably inserted while being everted inside the affected pipeline 3 without generating considerable friction in the curved portion 33b.

Such a bottom eversion as described above, which everts the pipe-lining material at the opening of the pipeline to be rehabilitated, is suitable for everting and inserting a pipe-lining material that has a diameter of less than 350 mm, for example.

When the pipe-lining material 1 is everted and inserted across a prescribed length inside the pipeline 3, the mounting pipe 60 is disconnected from the storage container 20 (the guide unit 22 is also considered to be a part of the storage container 20).

Figure 6:
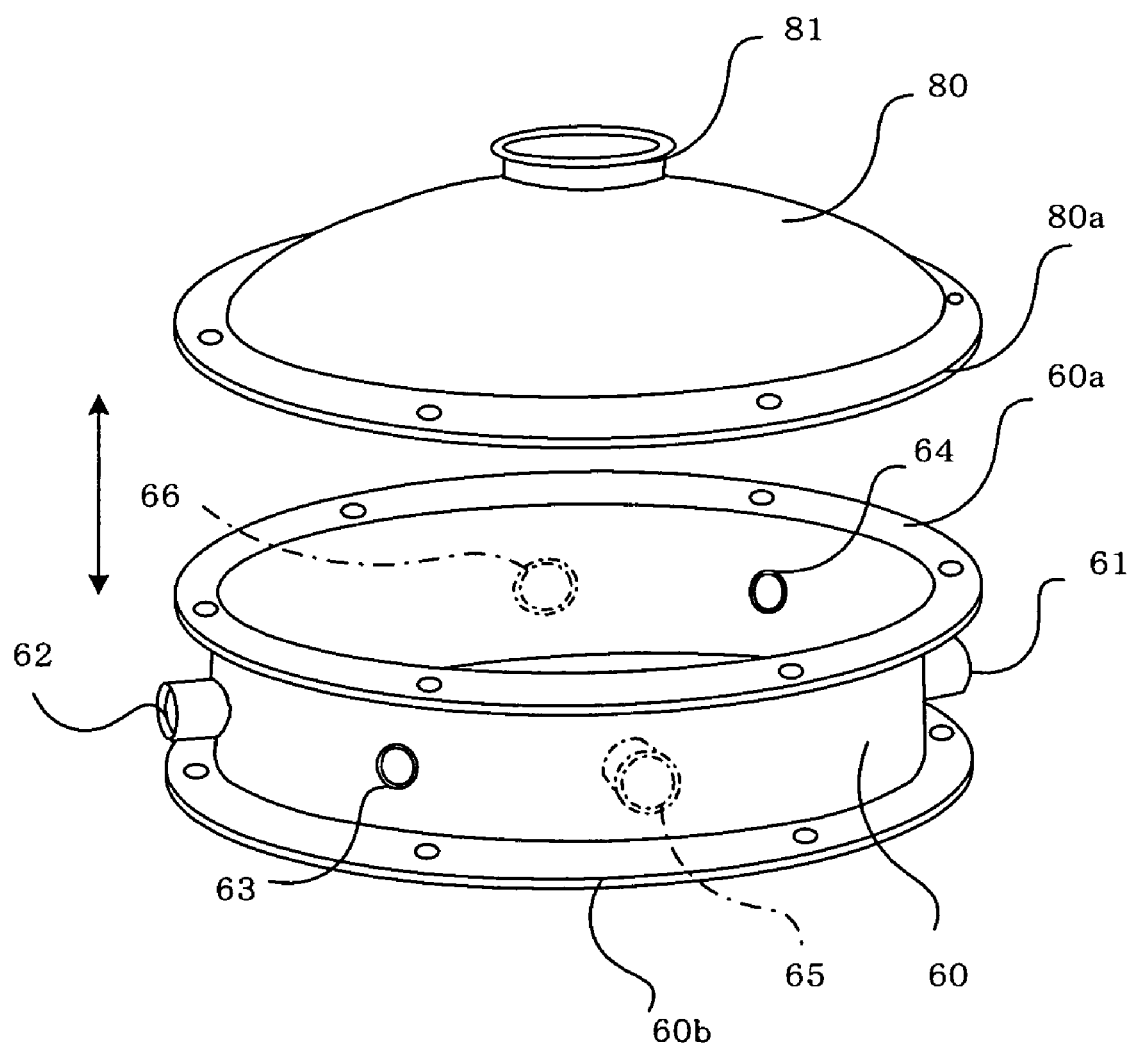
FIG. 6 is a perspective view showing the external appearance of the mounting pipe and pressure lid.
Figure 7:
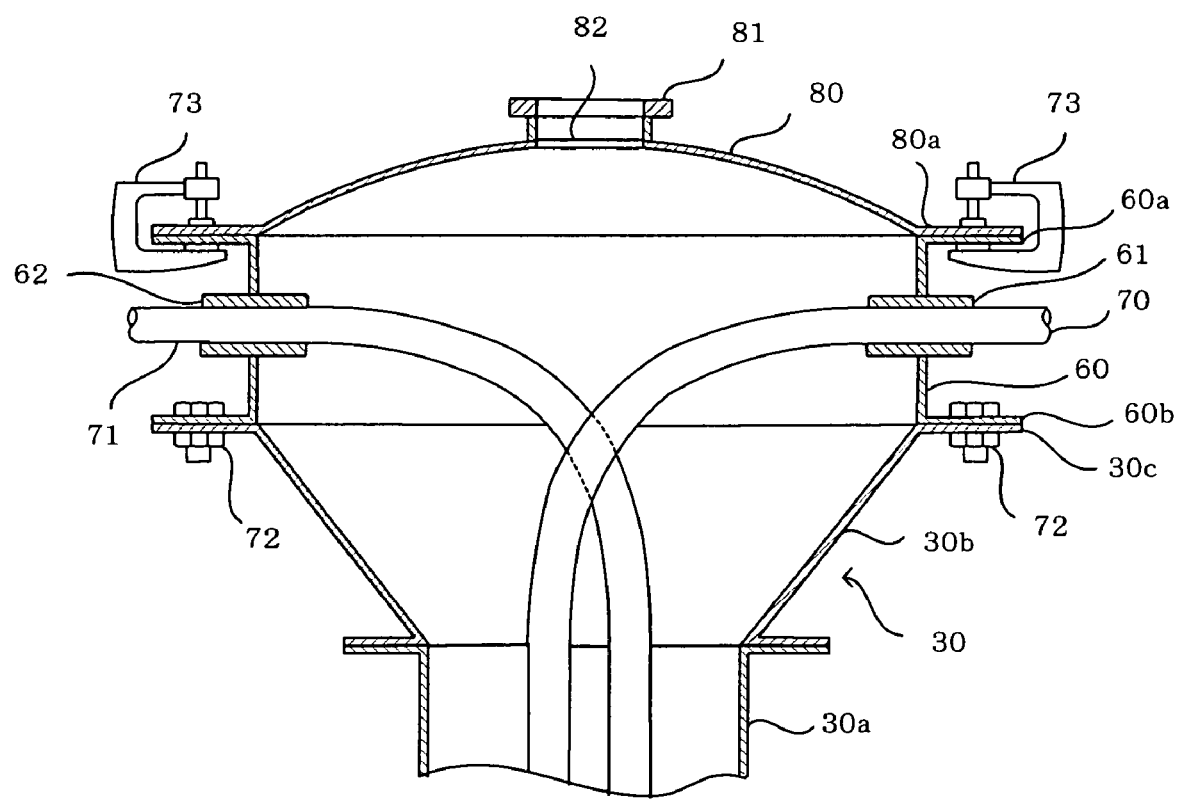
FIG. 7 is a vertical sectional view of the mounting pipe and pressure lid.

The mounting pipe 60 is a circular pipe member provided with upper and lower flanges 60a and 60b, as shown in FIGS. 6 and 7. The flange 80a of an airtight pressure lid 80 is airtightly mounted on the flange 60a by way of a plurality of clamps 73. The flange 60b of the mounting pipe 60 is airtightly mounted on the flange 30c of the conical portion 30b of the nozzle by way of fixing means 72, which is composed of a plurality of bolts and nuts.

Ducts 61 and 62 that allow the heat medium supply hose 70 and heat medium drain hose 71 to be brought into the interior of the pipe are mounted in the side of the mounting pipe 60. A mounting hole 63 for mounting an air supply hose (not shown) that supplies compressed air, and a mounting hole 64 for mounting an air exhaust hose (not shown) are also formed in the side of the mounting pipe. The ducts 61 and 62 and the mounting holes 63 and 64 are airtightly sealed using caps or the like before hoses are mounted.

After the mounting pipe 60 had been disconnected from the storage container 20, the pressure lid 80 is mounted on the top of the mounting pipe 60 and compressed air is supplied to the interior of the mounting pipe. The pressure lid 80, mounting pipe 60, induction nozzle 30, guide pipes 31 and 32, adjustment pipe 34, and everting nozzle 33 form an airtight structure overall. Therefore, the pipe-lining material 1 mounted on the everting nozzle 33 is expanded and pressed against the inner wall surface of the pipeline 3 to be rehabilitated.

In this state, the heat medium supply hose 70 and heat medium drain hose 71 are introduced, as shown in FIG. 7, from a side portion of the mounting pipe 60 to the manhole 2 and the interior of the pipeline 3 by way of the ducts 61 and 62 with the other end of the heat medium supply hose 70 connected to the heat medium supply source (not shown). Since a window 81 having a transparent acrylic plate 82 is mounted on the top of the pressure lid 80, workers can confirm through the window whether the heat medium supply hose 70 and heat medium drain hose 71 are being smoothly introduced into the everted pipe-lining material inside the pipeline to be rehabilitated. At this point, the hoses 70 and 71 are introduced from the side portion rather than the top part of the mounting pipe 60 into the interior, allowing the state of the hose introduction to easily be observed and confirmed through the window 81.

Figure 5:
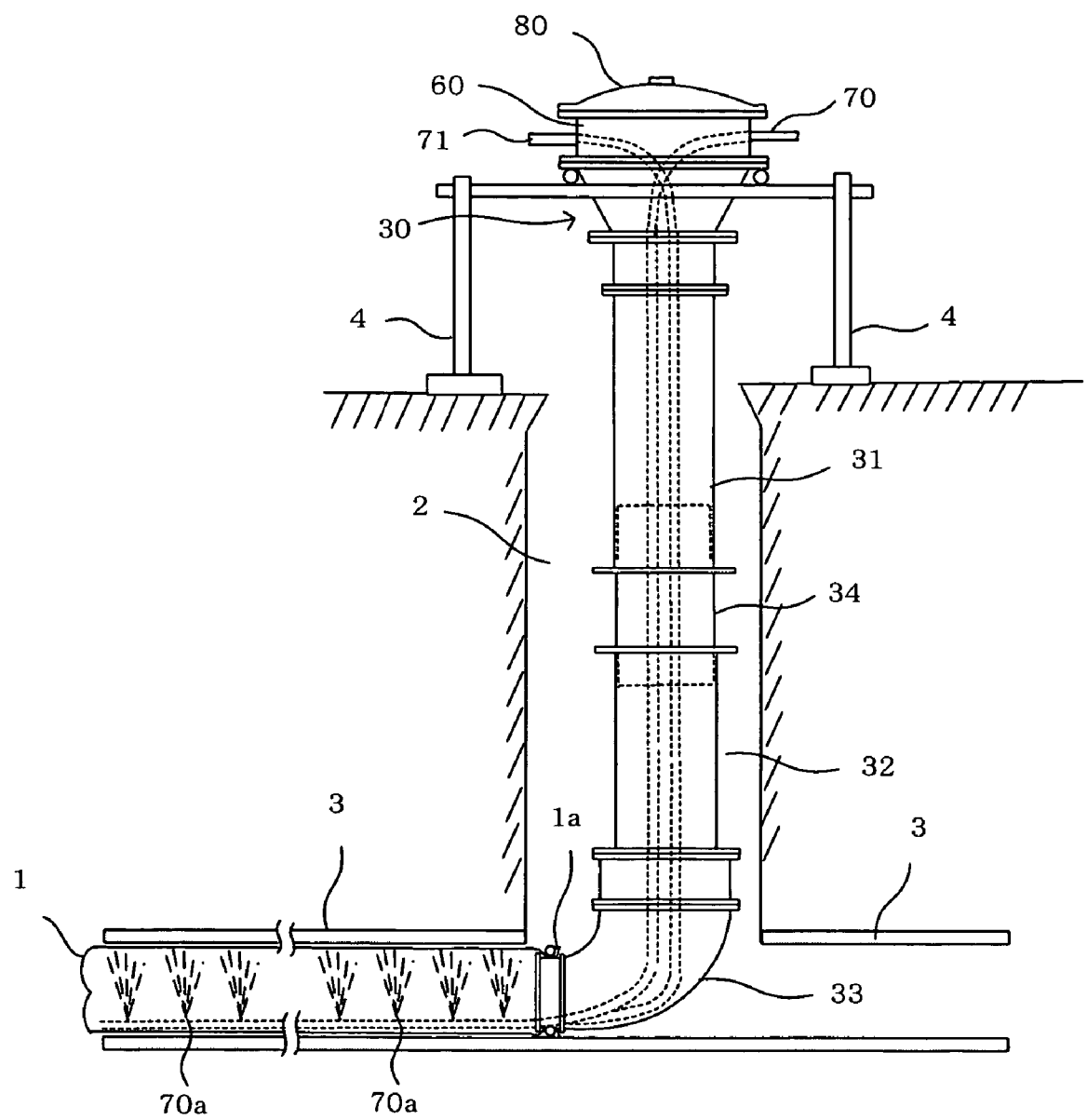
FIG. 5 is a schematic view showing the process in which the pipe-lining material is cured after being everted and inserted.

After it has been confirmed that the hoses 70 and 71 have been inserted into the pipe, the heat medium is fed to the pipe-lining material 1 by way of the heat medium supply hose 70. Hot water or steam may be used as the heat medium, and the hot water or steam is made into a mist and blown onto the everted pipe-lining material 1 by way of spray ports 70a arranged on the hose 70, as shown in FIG. 5. This allows the thermosetting resin impregnated in the pipe-lining material 1 to be heated and cured to thereby line and rehabilitate the inner wall surface of the pipeline 3. After the pipe-lining material 1 has cured, the air is exhausted to the exterior by way of the air exhaust hose.

In the case of hot water, showering can be using in place of a mist. Alternatively, the pipe-lining material can be cured by discharging hot water or steam from the distal end of the hose 70 to fill the interior of the pipe-lining material with hot water or steam.

The hot water used for heating is externally drained by way of the heat medium drain hose 71, and can be returned to the heating medium supply source and recirculated. A discharge portion 33f can be provided in the curved portion 33b of the everting nozzle 33 rather than introducing a heat medium drain hose 71 from the mounting pipe 60, and the heat medium used for curing can be drained by way of the drain 33f, as indicated by the imaginary line shown in FIG. 4.

Heat medium supply (drain) hoses having different diameters, and ducts 65 and 66 having different diameters, as indicated by the imaginary line shown in FIG. 6, can be mounted on the mounting pipe 60. A plurality of holes for mounting the air supply hose and a plurality of holes for mounting the air exhaust hose can be provided to the side portion of the mounting pipe 60.

Compressed air for everting and inserting the pipe-lining material may be supplied by way of the air supply hose mounted on the mounting hole 63 formed in the mounting pipe 60 rather than being supplied from the duct 26 disposed in the storage container 20.

The pressure lid 80 may be a flat transparent acrylic plate rather than a bowl-shaped lid such as that shown in FIG. 6, and may cover the entire top of the mounting pipe 60. In this case, a large transparent window can be obtained, and the introduction of hoses and other components can be better observed and monitored.

What is claimed is:

1. An apparatus for everting and inserting, via a vertical manhole, a pipe-lining material impregnated with a curable resin for use in rehabilitating an underground pipeline that extends in a direction inclined relative to the vertical manhole, the apparatus comprising:

a storage container storing the pipe-lining material in an un-everted state;

an everting nozzle for everting the pipe-lining material, the everting nozzle having a nozzle opening that confronts an opening of the pipeline to be rehabilitated during use of the apparatus so that when the pipe-lining material is drawn from the storage container and is brought un-everted up to the everting nozzle and attached to the nozzle opening thereof and fluid pressure is supplied inside of the pipe-lining material, the pipe-lining material is everted and inserted into the pipeline to be rehabilitated in a pipe-extending direction thereof; and a mounting pipe removably connected to the storage container and disposed between the everting nozzle and the storage container, the mounting pipe having an upper portion with an open end through which the pipe-lining material is inserted when brought un-everted up to the everting nozzle and attached to the nozzle opening thereof, a side portion with a duct through which a heating medium supply hose is introduced into the everted pipe-lining material for supplying a heating medium into the everted pipe-lining material after the mounting pipe is disconnected from the storage container following completion of the eversion and insertion of the pipe-lining material into the pipeline to be rehabilitated, and a window via which the introduction of the heating medium supply hose into the everted pipe-lining material through the duct of the mounting pipe is observed.

2. An apparatus according to claim 1; wherein the duct through which the heating medium supply hose is introduced comprises a first duct; and wherein the mounting pipe has a second duct extending through the side portion thereof and through which a drain hose is introduced into the everted pipe-lining material for draining the heating medium supplied into the pipe-lining material via the heating medium supply hose.

3. An apparatus according to claim 1; wherein the everting nozzle has a drain port for draining the heating medium supplied into the pipe-lining material.

4. An apparatus according to claim 1; wherein the storage container stores a rotary body around which the un-everted pipe-lining material is wound in a roll.

5. An apparatus according to claim 1; further comprising a lid for covering the open end of the mounting pipe after the mounting pipe is disconnected from the storage container following completion of the eversion and insertion of the pipe-lining material into the pipeline to be rehabilitated.

6. An apparatus according to claim 5; wherein the lid has the window.

7. An apparatus according to claim 5; wherein the lid comprises a flat transparent acrylic plate forming the window.

8. An apparatus according to claim 5; wherein the lid comprises a bowl-shaped structure having an opening at an apex portion thereof forming the window.

9. An apparatus according to claim 1; wherein the everting nozzle comprises a distal end portion having a nozzle opening on which the pipe-lining material is mounted, a columnar portion having an opening with an orientation substantially orthogonal to the nozzle opening, and a curved portion interconnecting the distal end portion and the columnar portion to one another.

10. An apparatus for everting a pipe-lining material for rehabilitating an existing pipe, the apparatus comprising:
    a storage container for storing a pipe-lining material in an un-everted state;
    an eversion nozzle for everting the pipe-lining material, the everting nozzle having a nozzle opening to which the un-everted pipe-lining material is attached and which confronts an opening of the pipeline to be rehabilitated during use of the apparatus; and
    a mounting pipe for removable connection between the storage container and the eversion nozzle, the mounting pipe having an exterior surface, an interior space, a side portion provided with at least one opening communicating the exterior surface with the interior space, and an upper portion with an open end through which the un-everted pipe-lining material is inserted for attachment to the nozzle opening of the eversion nozzle.

11. An apparatus according to claim 10; further comprising a lid that covers the open end of the mounting pipe in a state in which the un-everted pipe-lining material is attached to the nozzle opening of the eversion nozzle and the mounting pipe is disconnected from the storage container.

12. An apparatus according to claim 11; further comprising means for supplying compressed air into the interior space of the mounting pipe and into the un-everted pipe-lining material in a state in which the lid covers the open end of the mounting pipe so that the pipe-lining material mounted on the everting nozzle is expanded and pressed against the inner wall surface of the pipeline to be rehabilitated.

13. An apparatus according to claim 12; further comprising means for supplying a fluid into or removing the fluid from the interior space of the mounting pipe via the opening provided in the side portion of the mounting pipe in a state in which the pipe-lining material is expanded and pressed against the inner wall surface of the pipeline to be rehabilitated.

14. An apparatus according to claim 13; wherein the means for supplying or removing the fluid comprises a hose extending through the opening provided in the side portion of the mounting pipe.

15. An apparatus according to claim 10; wherein the at least one opening provided in the side portion of the mounting pipe comprises a plurality of openings via which respective heat medium supply, heat medium drain, air supply, and air exhaust hoses are introduced into the interior space of the mounting pipe.

16. An apparatus according to claim 15; wherein the mounting pipe has a window via which the introduction of the hoses into the interior space of the mounting pipe is observed.

17. An apparatus according to claim 16; further comprising a lid that covers the open end of the mounting pipe in a state in which the un-everted pipe-lining material is attached to the nozzle opening of the eversion nozzle and the mounting pipe is disconnected from the storage container, the lid having the window.

18. An apparatus according to claim 10; wherein the everting nozzle comprises a distal end portion having a nozzle opening on which the pipe-lining material is mounted, a columnar portion having an opening with an orientation substantially orthogonal to the nozzle opening, and a curved portion interconnecting the distal end portion and the columnar portion to one another.

* * * * *